Patented Dec. 3, 1946

2,412,182

UNITED STATES PATENT OFFICE 2,412,182

WATER-DISPERSED TACKY RUBBER ADHESIVE

Henry N. Stephens, White Bear, Minn., assignor to Minnesota Mining & Manufacturing Company, St. Paul, Minn., a corporation of Delaware No Drawing. Application November 5, 1946,
Serial No. 707,890

16 Claims. (Cl. 260—731)

This invention relates to improved water-dispersed rubber adhesives or cements, which dry to form smooth tacky tenacious adhesive films.

This application is a continuation-in-part of my copending application Serial No. 373,318, filed January 6, 1941, which latter is a continuation-in-part of my parent application Serial No. 199,189, filed March 31, 1938. Certain of the disclosure of this application is also common to that appearing in my copending application Serial No. 406,397, filed August 11, 1941, to issue on December 3, 1946. Reference is also made to the application of Harvey J. Livermore, Gordon F. Lindner and myself, Serial No. 247,842, filed December 27, 1938, now U. S. Patent No. 2,310,972.

Generally, the dispersion of rubber in water with the use of emulsifying agents is old. However, the use of ingredients hereinafter specified and the particular manner in which they are incorporated, materially increases the tackiness of dried deposits and decreases the susceptibility toward viscosity changes as compared with the so-called rubber dispersions heretofore manufactured.

In accordance with the present invention I am able to make water-dispersed adhesive compositions having a rubber base and being of the oil-in-water type which are of such character that when applied as films quickly break to provide a tacky adhesive film, the tack and adhesiveness of which is substantially or approximately equal to that of an adhesive composition (e. g. a gasoline solvent type adhesive, such as illustrated by Zimmerli et al, U. S. Patent No. 1,892,123) having the same water-insoluble solids in the same proportions, for example, having the same ratio of rubber and resin.

These soap-type or equivalent water-dispersed rubber adhesives are prepared as follows: A tack-producer, which is preferably compatible with the rubber in all proportions, which is preferably non-acidic or which has a relatively low acid value, and which is preferably substantially insoluble in dilute aqueous alkali solutions, such as low acid type ester gum, or a neutral resin such as "Nevillite," is mixed in an internal mixer with the rubber, and, if desired, a filler which may comprise in whole or in part a pigment, or the like, together with a suitably small proportion of a higher aliphatic or cycloaliphatic acid serving as a soap-forming acid. The tack-producing agent, which is desirably of a resinous nature, is preferably one which blends with the rubber in all proportions and renders it tacky, and is present in a proportion adapted to produce this result, preferably about ⅓ to ⅔ part per part of rubber, yielding a smooth compatible composition. Of the above mentioned tack-producing agents, "Nevillite" is to be preferred for its complete freedom from acids; however, for economic reasons, where reclaimed rubber or like rubbery material is used, we often prefer to use in practice ester gums derived from gum rosins or wood rosins, which give sufficiently satisfactory results.

"Nevillite" resin is a material well known to those skilled in the art, and is a hydrogenated polymer or mixture of polymers of very low iodine number derivable from non-nitrogenous polymerizable coal tar unsaturates. It may be made by hydrogenation, e. g. with Raney nickel catalyst, of constituents such as polymers derived from idene, coumarone and/or cyclopentadiene. The hydrogenated polymers are characterized by a very high compatibility with rubber as contrasted with the coumarone-indene type resins, and by resistance to development of color by atmospheric oxidation. The resin should preferably have a melting point of about 70° C. or higher, melting points of about 150° C. or even higher being readily attainable in this type of resin. For further information on this type of non-acidic synthetic resin and on hydrogenation techniques, reference is made to the U. S. patent to Carmody, No. 2,152,533, issued March 28, 1939, and to the article in "Industrial and Engineering Chemistry," vol. 32, pages 684–692 (May, 1940). The resin (sold by the Neville Co., Pittsburgh) need not be described further, since it is per se no part of the present invention, but it is to be observed that it distinguishes widely from coumarone resin or the like in its use in the present invention, among other things in respect to solubility or compatibility with rubber.

After a homogenous mixture (including rubber, compatible organic tack-producer therefor, and preferably also soap-forming acid) has been obtained, water is worked into the mass, in the disperse phase, in sufficient amount, but not greatly in excess thereof, to permit an inversion of phase upon continued mixing at a suitable temperature merely upon the addition of the necessary amount of alkali, such as potassium hydroxide, to render the dispersion alkaline and form soap. The soap, which acts as the dispersing agent, is thus formed in situ at the point of inversion by addition of said alkali with continued mixing. After inversion, the resulting oil-in-water type dispersion may, of course, be diluted to the desired viscosity by the addition of water.

This procedure is found to be more effective, both in terms of process and the resulting dispersed adhesive, than the use of pre-formed soap or soap formed in situ before the addition of water in substantial amount; in the latter case, with the soap already formed, it would then be required that water be introduced gradually over a period of hours, in commercial operations, to effect inversion.

The tack-producer is acted upon only slightly, if at all, by the free alkali, which (where it forms a soap which is the dispersing agent) should be present in substantial excess in the finished stable dispersion, that is, the pH of the final dispersion should be above 7. The lower the acid number of the resin, the less will it be attacked by the alkali.

The objects and advantages of my improved water-dispersed cements are several. First, I obtain a sprayable dispersion, which in use is relatively quick breaking, which has extensive utility as an adhesive, e. g., in attaching felts, fabrics, and the like, to metal, wood, glass, etc., or to each other, and has many advantages over adhesive cements of the gasoline solvent type, including the avoidance of inflammable and toxic vapors. Such adhesives preferably remain sufficiently pressure-sensitive over a period of a few minutes to several hours or days, or longer, after evaporation of water, so as to permit efficient bonding of elements and utilization of the adhesive. Second, by the formation of the dispersing agent in situ at the point of inversion, I obtain stable dispersions of unusually low viscosity for a given solids content, and having a low susceptibility to viscosity increase upon standing. Third, I find that the formation of the soap in situ at the point of inversion, particularly where the water present at the point of inversion is limited substantially to that which is sufficient as above indicated, provides important technological advantages and economies, both in terms of process and composition, the resulting composition having very different and superior characteristics as an adhesive from all dispersions of oil-in-water type made by prior art methods known to me. This technique permits the making of my tacky dispersions by relatively unskilled labor, as no special care is needed in handling. Whereas in dry mixes where the soap is present, water must be added very carefully up to the inversion of phase, in the above process no special care is necessary either in the addition of the first portion of water with its primary dispersion in the rubber phase or in the subsequent addition of the alkali to cause an inversion of phase or in the final dilution to a composition of desired fluidity which, when dried, possesses unimpaired tackiness, i. e. pressure-sensitivity. Fourth, I desire a product in which the rubber and resin are uniformly blended in the discrete particles of dispersed material in the oil-in-water type dispersion, as contrasted with mere mixtures of emulsions or dispersions of rubber with emulsions or dispersions of resins, asphalt or the like. Fifth, I produce an oil-in-water dipersion, highly useful as an adhesive, by first producing a stiff and plastic, though workable, water-in-oil type dispersion and then inverting the same by the production of a soap or like dispersing agent in situ at the point of inversion after sufficient but substantially only sufficient water has been uniformly incorporated into the tacky rubber material to permit inversion upon formation of the dispersing agent in situ, whereupon an adhesive is attained which is of advantageous and novel properties both in the form of the dispersion and in the form of the dried film produced therefrom. Sixth, it is an object of this invention to modify and increase the tack of the natural, synthetic or reclaimed rubber with a material which is normally composed in part, or even substantially completely, of a relatively non-acidic tack-producer, such as the tack-producing resins or resinous substances above illustrated, whereupon I attain a dispersion which contains only a small proportion of water-soluble soap, and a proportion of tack-producer which is substantially that introduced into the original mix; and this dispersion dries to form a tacky, pressure-sensitive film in which the soap content is low. Seventh, a further object is to produce a water-dispersed adhesive which shortly after application as a film to a surface of metal, etc., will break over upon evaporation of a part of the water, whereupon a tacky, pressure-sensitive film is then immediately provided, permitting prompt bonding, e. g., of fabric to metal. A further object is to produce an adhesive as just defined which, in the form of the dried film, forms a bond which has good resistance to water. A further object (where a natural crude or a synthetic rubber is used along with ester gum, "Nevillite" resin, etc.) is to produce a water dispersion which, upon application as a film, yields a transparent, tacky pressure-sensitive film, which is heat-resistant and water-resistant. These and other objects and advantages appear from the description as a whole.

While I necessarily illustrate my improved dispersed rubber cement by describing the use of specific ingredients, it will be readily understood that the substitution of an equivalent ingredient in substantially equivalent proportion and using substantially the same or an equivalent method of mixing, will result in a like cement. While I prefer to use potassium hydroxide as an emulsifying or soap-forming agent, a like water-soluble alkali such as sodium hydroxide may be substituted. While I prefer to use an unsaturated aliphatic or alicyclic acid, e. g., oleic acid, to react with the alkali to form the soap emulsifying agent, I may employ other unsaturated higher aliphatic, alicyclic, or resin acids such as linoleic acid or abietic acid, or, less desirably, I may substitute in whole or in part saturated acids such as stearic acid or the naphthenic acids, all such acids, or equivalent materials capable of reacting with a second reactant, e. g. an alkali, being designated in the claims by the term "soap-forming acid."

Without intention to limit this improvement in adhesives, it is to be understood that a filler such as clay, slate flour, and the like, or a pigment such as carbon black, zinc sulfide and the like, or mixtures thereof, may be used with the rubber, which may be either natural or synthetic, or preferably reclaimed rubber such as whole tire reclaim, but such fillers may be omitted entirely, and compositions where no filler is added or included are among the important comprehended embodiments of my invention.

To illustrate the embodiments of this invention, the following examples in the form of representative formulae are given in which ingredients are used in approximate percentages by weight as indicated, based on the final composition as a whole:

*Example 1*

|  | Per cent |
|---|---|
| Milled reclaimed rubber | 33 |
| Clay (non-colloidal) | 16.5 |
| Ester gum (low acid type) | 11 |
| Oleic acid | 1 |
| Potassium hydroxide | 0.75 |
| Water | 37.75 |

In general, for preparing this composition, mix the milled reclaimed rubber and ester gum with the oleic acid in a suitable mixer, such as a Werner-Pfleiderer mixer, warming the batch to a temperature of approximately 190° to 210° F. by use of steam in the jacket of the mixer; then shut off the steam and work in the filler with cold water circulating in the jacket of the mixer to prevent a further rise in temperature from the internal work. Next is added approximately 15 to 30 percent of the total water, in this specific case about 22 percent thereof (which may be all or partly in the form of ice to secure more rapid cooling to the temperature of inversion) and mixing is continued until the water has been thoroughly incorporated. It will be seen that the amount of water thus added prior to inversion in Example 1 is approximately 15 percent by weight of the total solids and in order to accomplish the results desired, the water content may not be varied greatly from that ratio with this specific mix. At this point, inversion will take place upon the addition of the required amount of alkali, a water-soluble soap (e. g., potassium oleate, potassium abietate, etc.) being thus formed in situ at the point of inversion of phase. Such inversion can be effected within a relatively wide temperature range. However, we have secured the most satisfactory dispersions at temperatures approximating 145° F., with slight variations within a range above and below 145° F., dependent on the particular mix and the size of the batch, which may in a commercial operation as here defined weigh about 2500 lbs. More water is then added gradually until the total mixing is complete.

Inversion of phase results in the rubber-resin blend going into the disperse phase, the dilute soap solution furnishing the continuous phase. The emulsion thus formed dries to a tacky, pressure-sensitive film upon evaporation of the water, in contrast to films from emulsions containing protective colloids such as casein or colloidal clay.

Rarely ever, even with wide variations in composition of the plastic mixture containing reclaimed rubber will the inversion temperature vary more than about 25° F. from 145° F., and usually in practice most advantageously the temperature of inversion will be within the range of 140° F. to 160° F.; see the aforesaid Livermore et al. Patent No. 2,310,972, page 3, etc.

Somewhat lower and also somewhat higher temperatures can be used in certain cases, but the highest temperature must necessarily be below about 175° F. with all plastic reclaimed rubber compositions known to me and should not be much, if any, above about 190° F., even with wide variations of plastic natural or synthetic rubber containing compositions, though in the latter case minimum inversion temperatures may be and commonly are relatively high, e. g., 160°, 170°, or 180° F., depending among other things on the amount of milling or mechanical work the rubber has received. With varying plastic compositions the optimum temperature range for inversion may be ascertained by trial and, although for each given composition the range may be quite narrow and critical, with different compositions the range may vary considerably, as above indicated.

*Example 2*      Per cent

| | |
|---|---|
| Reclaimed rubber | 30.00 |
| Ester gum (low acid type) | 19.7 |
| "Dixie" clay | 14.75 |
| Oleic acid | 1.28 |
| Potassium hydroxide | .5 |
| Water | 33.7 |

One part of reclaimed rubber is milled for 20 minutes on a rubber mill and is then placed in an internal mixer where it is further worked on for an additional five minutes. During the time it is in this mixer, it is heated by the internal heat that is developed during the kneading operation plus the additional heat supplied to the mixer by putting steam into the steam jacket provided on such a mixer, and the temperature rises to about 190° to 210° F. (Where, in the case of different batches the stiffness of the mass makes the same desirable, the temperature at this point may be allowed to rise somewhat higher, e. g., to 240° F. to 250° F., more or less.)

Two-thirds part of ester gum is then added and the mixing is continued, the ester gum being added at as rapid a rate as it can be put in the mixer without causing lumps to form in the composition. The mixing is continued until the combination of ester gum and reclaim is of a smooth texture.

One-half part of Dixie clay is next added and the mixing is continued until this ingredient has been thoroughly incorporated. During all of this mixing operation it is necessary to continue to do work on the stock to get a smooth mixture, and in some cases it has been observed that adding all of the ester gum at one time makes the combination of ester gum and reclaim too liquid to permit re-incorporation of lumps of reclaim which may form, so that in order to increase the viscosity of the mass and keep it at the right consistency, the procedure is altered by adding clay and ester gum alternately. The oleic acid, or equivalent soap-forming acid, may be added at this point or at any previous point in the process.

After the above-mentioned ingredients have been added and a smooth consistency has been attained, sufficient water, and substantially only sufficient water as herein illustrated, as may be determined by trial, is then added to render the batch invertible upon addition of alkali, and the batch is brought to the inversion temperature, preferably about 145° F. In commercial practice, with a batch having a total weight of about 2500 lbs., the circulation of cooling water is so adjusted as to attain the above temperature at about the time the water has all been worked into the mixture.

The potassium hydroxide is next added, preferably dissolved in two to three times its weight of water, whereupon inversion of phase begins. The mixing is now continued with a lowering of temperature until inversion of phase is substantially complete, the rubber and resin, together with filler, becoming the internal phase and the water solution of soap becoming the external phase of the dispersion or composition. The balance of the water is then incorporated and mixed until a smooth composition of desired fluidity or consistency is formed.

With the above described methods of incorporating the above ingredients into an adhesive composition, we have produced an emulsion in which the adhesive material remains in the dispersed phase in a stabilized state in containers during storage, and when applied in use, it dries to form a smooth homogenous normally tacky adhesive film which is tenacious and adhering.

As above pointed out, the water added prior to inversion must not much exceed that amount which is sufficient to permit inversion. Also, for any given batch, the inversion temperature is quite critical. Therefore, after the rubber, tack-producer, etc., are uniformly mixed and blended together, usually at a temperature above the inversion temperature, water is introduced, usually partly or largely in the form of ice, and the proportion of water and ice should be adjusted so as to control and accomplish just the desired temperature reduction without adding too much water and without exceeding the maximum optimum water content prior to inversion. If this feature of control is not adhered to, the batch of cement may be ruined; see the aforesaid U. S. Patent No. 2,310,972 of Livermore, Lindner and myself. While the optimum proportion of water to solids introduced prior to inversion may vary considerably with differing mixtures or compositions, as above indicated, yet the water is commonly introduced only in a minor proportion by weight of the solids, seldom going above about 25 percent or below about 10 percent in the production of aqueous adhesive rubber dispersions of quite widely varying characteristics known to me. However, for any predetermined batch and chosen inversion temperature within the inversion range, the proportion of water to solids must ordinarily be kept within a variation of plus or minus about 10 percent of the optimum proportion, and often this variation must be still more closely restricted; that is, if the optimum proportion of water to solids is 20 percent by weight, ordinarily it is important to make sure that the proportion of water to solids, by weight, is kept within the range of 18 to 22 percent, or even within the more restricted range of 19 to 21 percent. With inversion temperatures near the lower end of the permissible range, the proportion of water to solids may be somewhat higher, and, vice versa, with inversion temperatures near the higher end of the permissible range, the proportion of water to solids may be somewhat lower than otherwise.

The optimum amount of water to be added to the blend of rubber and tackifier prior to inversion, and which in the case of Example 1 herein is very close to 14 percent of the total weight of dry solids, may be readily determined by trial, for any given composition. Thus, in the formula and under the conditions indicated in Example 1, if the potassium hydroxide is added before sufficient water has been worked into the batch, inversion does not occur on such addition. If too much water is present, addition of the potassium hydroxide results in foaming and in the formation of a relatively coarse dispersion. On the other hand, where the optimum amount of water is present, the batch inverts readily and quickly to a smooth oil-in-water type dispersion of fine particle size, which may then be rapidly and safely diluted to the desired viscosity.

It is generally (though not always) the case that where a filler such as a non-colloidal or low colloidal clay is absent, or is present in fixed ratio to rubber or reclaim, the higher the proportion of compatible resinous tack-producer to rubber, within limits commonly desired for adhesives, the lower will be the optimum temperature for inversion.

Herein various illustrative details of operation and certain specific materials are set out to illustrate and not to limit my invention. For example, the oleic acid of the above examples may be present in different proportions, slightly higher where desirable to get increased stability, or it may be replaced by other soap-forming acids, or comparable reactants, which may be reacted, e. g., with KOH, etc., to produce a dispersing agent in situ at the point of inversion. Also while ester gum, e. g., of low acid number, and "Nevillite" resin are given as illustrations of tack-producers for rubber, having the combined virtues of being compatible with rubber in all proportions, being good tack-producers therefor, and being substantially unattacked by dilute aqueous alkaline solutions, it is to be understood that certain other resins or resinous materials may be employed so long as they are sufficiently compatible with the rubber and permit the final pH of the dispersion to be greater than 7, (i. e. permit the alkaline material to be in excess), while still serving the function of increasing the tack or pressure-sensitivity of a dried film of such dispersion to an interesting or sufficient degree. However where a transparent or clear dried film is desired, as where a light-colored rubber, which is substantially transparent in the form of thin films or sheets, such as natural or synthetic rubber is employed, it is, of course, necessary to employ a tack producer which, like ester gum and/or "Nevillite" resin, will not discolor or opacify the dried film; also opaque fillers are normally excluded where transparency of the final film is desired.

In order to be considered "sprayable," as contemplated herein, an adhesive composition must be capable of application from a spray gun, must not be stringy, and must form as small droplets on the surface sprayed.

All embodiments within the scope of the appended claims are comprehended.

What I claim is:

1: A sprayable water-dispersed, pressure-sensitive rubber adhesive composition of the oil-in-water type, in which rubber is in dispersed phase and the tack of the rubber is improved by having blended therewith a substantially non-acidic and substantially water-insoluble resinous tack producer having a much higher compatibility with rubber than cumarone-indene resins, the individual dispersed particles thereby being a uniform blend of said rubber and said resinous tack producer, and further characterized in that in the form of a film, upon evaporation of water, said film is highly tacky and will adhere tenaciously to smooth metal surfaces.

2. A sprayable water-dispersed rubber adhesive of the oil-in-water type characterized by being resistant to viscosity increase upon standing, drying to form smooth tacky tenacious adhesive films, and comprised of reclaimed rubber blended with a substantially non-acidic tack-producing synthetic resin possessing high compatibility with rubber in proportions to produce a normally tacky composite, said blend being dispersed in an aqueous solution containing a small proportion of water-soluble soap and alkali in substantial excess, and further characterized in that said adhesive films of said rubber adhesive, upon application to a smooth metal surface, adhere tenaciously thereto.

3. A sprayable water-dispersed rubber adhesive of the oil-in-water type characterized by being resistant to viscosity increase upon standing, drying to form smooth tacky tenacious adhesive films, and comprised of rubber blended with ester gum from wood rosin in proportions to produce a normally tacky composite, and said blend being dispersed in an aqueous solution containing a soluble soap and excess caustic alkali, and further characterized in that films of said water-dispersed rubber adhesive, upon evaporation of water, become highly tacky and will tenaciously adhere to smooth metal surfaces.

4. A sprayable water-dispersed rubber adhesive characterized by being resistant to viscosity increase upon standing, drying to form smooth tacky tenacious adhesive films, and comprised of reclaimed rubber, and a filler, blended with ester gum from wood rosin in proportions to produce a normally tacky composite, and said blend being dispersed in an aqueous solution containing potassium hydroxide in substantial excess and a small proportion of soap formed by the reaction of potassium hydroxide and an unsaturated soap-forming acid, and further characterized in that films of said water-dispersed rubber adhesive, upon evaporation of water, are highly tacky and will tenaciously adhere to smooth metal surfaces.

5. An adhesive comprising a uniform blend of rubber and water-insoluble synthetic resin which is highly compatible with said rubber, said blend being dispersed in an aqueous vehicle, using a dispersing agent, and the resulting adhesive dispersion being non-inflammable and being further characterized in that, upon application as a coating or film and evaporation of water, it thereby develops a tackiness substantially equal to that of a film of a homogeneously blended rubber-resin adhesive free of dispersing agents and having the same water-insoluble solids in the same proportions.

6. An adhesive composition of the oil-in-water type comprising rubber plasticized with a resin, providing a uniform blend of said rubber and said resin, said blend being dispersed as finely divided particles in an aqueous vehicle with a soap formed from a water-soluble base and an organic, soap-forming acid to form a highly stable dispersion, further characterized in that upon evaporation of water it yields a coherent, tacky, pressure-sensitive adhesive film, said resin being a substantially non-acidic and substantially water-insoluble tack-producer which has a very much higher compatibility with rubber than cumarone-indene resins, and said composition being characterized in that said film is tacky and pressure-sensitive and has good adhesion to smooth metal surfaces, and further characterized in that said coherent tacky film possesses a tackiness substantially equal to that of a film of homogeneously blended rubber-resin adhesive free of dispersing agents and having the same water-insoluble solids in the same proportions.

7. A sprayable highly-stable water-dispersed rubber-containing adhesive composition of the oil-in-water type in which the tackiness of the rubber is enhanced by having ester gum blended therewith to provide a substantially homogeneous composite, said ester gum being present in a substantially lesser amount by weight than the rubber but to a greater extent than one-third of said rubber, said homogeneous composite being stably dispersed as finely divided particles in the aqueous vehicle, said composition being non-inflammable and being further characterized in that upon application as a film it will quickly break to provide a coherent pressure-sensitive adhesive film which is strongly adherent to smooth metal surfaces merely upon contact under light pressure, said adhesive film additionally having good resistance against re-dispersion in water and having sufficient heat resistance that its softening point is substantially above the highest atmospheric temperature normally encountered, and further characterized in that said coherent tacky film possesses a tackiness substantially equal to that of a film of homogeneously blended rubber-resin adhesive free of dispersing agents and having the same water-insoluble solids in the same proportions.

8. A sprayable water-dispersed rubber-containing pressure-sensitive adhesive composition of the oil-in-water type in which the tackiness of the rubber is enhanced by having intimately blended therewith a substantially non-acidic tack-producing resin which has a much higher compatibility with rubber than cumarone-indene resins, providing a substantially homogeneous composite, said resin being present to an extent by weight not greater than approximately two-thirds that of said rubber but being present to the extent of at least approximately one-third that of the rubber content of said adhesive composition, said homogeneous composite being dispersed as finely divided particles in the aqueous vehicle, said oil-in-water type adhesive composition being characterized in that upon application as a film, exposed to evaporation, it will quickly break to provide a coherent, tacky, adhesive film, and further characterized in that said coherent tacky film possesses a tackiness substantially equal to that of a film of homogeneously blended rubber-resin adhesive free of dispersing agents and having the same water-insoluble solids in the same proportions.

9. A water-dispersed pressure-sensitive reclaimed rubber adhesive of the oil-in-water type in which the tackiness of the reclaimed rubber is enhanced by having ester gum uniformly blended therewith, to provide a substantially homogeneous composite, said ester gum being present to the extent by weight approximately of one-third to two-thirds that of said rubber, said composite being dispersed as finely divided particles in the aqueous vehicle, said water-dispersed adhesive being non-inflammable and being further characterized in that upon application as a film to a smooth metal surface it will break quickly to provide a coherent and tenaciously adherent pressure-sensitive adhesive film, and further characterized in that said coherent tacky film possesses a tackiness substantially equal to that of a film of homogeneously blended rubber-resin adhesive free of dispersing agents and having the same water-insoluble solids in the same proportions.

10. A stable sprayable water-dispersed rubber-containing pressure-sensitive adhesive of the oil-in-water type in which the tackiness of the rubber is enhanced by having blended therewith a substantially non-acidic plastic organic tack-producing substance compatible with rubber in all proportions, providing a substantially homogeneous composite, said tack-producing substance being present in a lesser amount by weight than the rubber content of said composition but being present to the extent of at least about one-third that of said rubber content, said substantially homogeneous composite being dispersed as finely divided particles in the water, said composition being further characterized in that upon application as a film it will quickly break to provide a tacky and pressure-sensitive adhesive film, and further characterized in that said coherent tacky film possesses a tackiness substantially equal to that of a film of homogeneously blended rubber-containing adhesive free of dispersing agents and having the same water-insoluble solids in the same proportions.

11. A sprayable and non-inflammable water-dispersed rubber adhesive of the oil-in-water type characterized by being resistant to viscosity increase upon standing, drying to form smooth tacky tenacious water-resistant adhesive films, and comprised of rubber and a filler blended with a substantially non-acidic tack-producing synthetic resin completely compatible with rubber in proportions to produce a normally tacky composite, and dispersed as finely divided particles in an aqueous solution containing a small proportion of soluble soap derived from an unsaturated acid and excess alkali, and further characterized in that said tacky film possesses a tackiness substantially equal to that of a film of homogeneously blended rubber-resin adhesive free of dispersing agents and having the same water-insoluble solids in the same proportions.

12. A stable sprayable water-dispersed rubber adhesive composition of the oil-in-water type characterized by being resistant to viscosity increase upon standing, drying to form smooth tacky tenacious water-resistant adhesive films, and comprised of reclaimed rubber and a filler blended with ester gum, in proportions to produce a normally tacky composite, and dispersed as finely divided particles in an aqueous solution containing potassium hydroxide in substantial excess and a small proportion of soap formed by the reaction of potassium hydroxide and an unsaturated soap-forming acid, and further characterized in that said smooth tacky adhesive films possess a tackiness substantially equal to that of a film of homogeneously blended rubber-resin adhesive free of dispersing agents and having the same water-insoluble solids in the same proportions.

13. A sprayable, highly-stable, water-dispersed rubber-containing adhesive composition of the oil-in-water type, and free of inflammable vehicle, in which the tackiness of the rubber is enhanced by having substantially uniformly blended therewith a substantially non-acidic and substantially water-insoluble tack-producing resin which is highly compatible with said rubber, providing a substantially homogeneous composite, said resin being present in lesser amount by weight than said rubber but to the extent of at least about one-third that of said rubber, said subtantially homogeneous composite being dispersed as finely divided particles in the aqueous vehicle, said composition being further characterized in that upon application as a film it will quickly break to provide a coherent tacky adhesive film which is strongly adherent to smooth metal surfaces merely upon contact under light pressure, said adhesive film additionally having good resistance against redispersion in water and having sufficient heat resistance that its softening point is substantially above the highest atmospheric temperature normally encountered, and further characterized in that said coherent tacky film possesses a tackiness substantially equal to that of a film of homogeneously blended rubber-resin adhesive free of dispersing agents and having the same water-insoluble solids in the same proportions.

14. A water-dispersed rubber adhesive composition of the oil-in-water type and of high stability characterized in that upon evaporation of water it yields a coherent, tacky, pressure-sensitive adhesive film, said composition being comprised of a blend of rubber and a substantially non-acidic and water-insoluble tack-producing resin completely compatible with rubber in all proportions, said blend being dispersed as finely divided particles in an aqueous solution containing a small proportion of water-soluble soap derived from an organic acid and excess alkali, and further characterized in that the aforesaid film, deposited on a smooth metal surface from the said dispersion, adheres tenaciously thereto, and further characterized in that said coherent tacky film possesses a tackiness substantially equal to that of a film of homogeneously blended rubber-resin adhesive free of dispersing agents and having the same water-insoluble solids in the same proportions.

15. A water-dispersed rubber adhesive composition of the oil-in-water type and of high stability comprising a homogeneous blend of rubber and a substantially non-acidic and water-insoluble tack-producing resin which is compatible with rubber in all proportions, yielding a normally tacky composite, said blend being stably dispersed as finely divided particles in the aqueous vehicle, further characterized in that, upon deposition as a coating or film and removal of water therefrom, it yields a coherent, pressure-sensitive adhesive film, and also characterized in that the aforesaid pressure-sensitive adhesive film, when formed on a smooth metal surface from the said water-dispersed adhesive composition, adheres tenaciously thereto, and further characterized in that said coherent tacky film possesses a tackiness substantially equal to that of a film of homogeneously blended rubber-resin adhesive free of dispersing agents and having the same water-insoluble solids in the same proportions.

16. A sprayable water-dispersed rubber-containing adhesive composition of the oil-in-water type and of high stability, comprising a uniform blend of rubber and a substantially non-acidic and water-insoluble tack-producing resin which is compatible with said rubber in all proportions, said resin being present in lesser proportion than said rubber but to the extent of at least one-half that of said rubber, said blend being stably dispersed, as finely divided particles, in the water phase, said adhesive composition being further characterized in that, upon deposition as a coating or film and evaporation of water therefrom, it yields a coherent, normally tacky adhesive film and further characterized in that said coherent tacky film possesses a tackiness substantially equal to that of a film of a homogeneously blended rubber-resin adhesive free of dispersing agents and having the same water-insoluble solids in the same proportions.

HENRY N. STEPHENS.